United States Patent Office 3,332,968
Patented July 25, 1967

3,332,968
INTERMEDIATES IN THE PREPARATION OF
17α-ETHYNYL-19-NOR STEROIDS
Robert Joly, Montmorency, Julien Warnant, Neuilly-sur-Seine, and Jean Jolly, Clichy-sous-Bois, France, assignors to Roussel-UCLAF, Paris, France, a corporation of France
No Drawing. Filed May 3, 1965, Ser. No. 452,879
Claims priority, application France, May 13, 1964, 974,351
The portion of the term of the patent subsequent to Nov. 1, 1983, has been disclaimed
2 Claims. (Cl. 260—397.3)

The present invention relates to a process for the preparation of 13β - alkyl-17α-ethynyl - $\Delta^{5(10),9(11)}$ - gonadiene-17β-ol-3-ones, of the general Formula I:

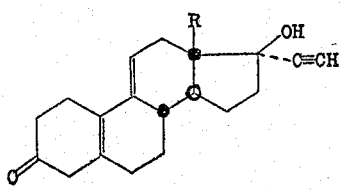

I wherein R represents, here and in the following, an alkyl group having from 1 to 4 carbon atoms.

It is known that 13β-methyl-17α-ethynyl-$\Delta^{5(10),9(11)}$-gonadiene-17β-ol-3-one (or 17α-ethynyl-$\Delta^{5(10),9(11)}$-estradiene-17β-ol-3-one), which belongs to the family of the compounds of Formula I, wherein R=methyl, possesses very interesting physiological properties. In particular this compound shows hypophysical inhibitory activity and more specifically an anti-folliculo-stimulating hormone activity (anti-F.S.H. activity). The preparation of this compound was described in U.S. Patent No. 3,033,856. The method described consists in the formation of an enamine of 13β-methyl-17α-ethynyl-$\Delta^{4,9}$-gonadiene-17β-ol-3-one, followed by hydrolysis in an acid medium. The starting compound could be obtained, starting from the methyl ether of estradiol, by the intermediate of the methyl ether of dihydroestrone and 13β-methyl-17α-ethynyl-$\Delta^{5(10)}$-gonene-17β-ol - 3 - one, according to well known methods [Peelman et al. J. Am. Chem. Soc., 82 (1960), 2,402; U.S. Patent No. 2,655,518; U.S. Patent No. 2,725,389].

This relatively tedious and delicate synthesis has, among other inconveniences, that of the introduction of the ethynyl group in the 17 position of the methyl ether of dihydroestrone. This creation of the 17β-hydroxy-17α-ethynyl grouping, at several stages before the conclusion of the synthesis, can present serious disadvantages. In fact, it is known that this grouping is sensitive to an acid medium, where in particular a rearrangement with an enlargement of the D ring may occur.

A more recent process [Steroids, vol. 1 (1963), page 113], for the preparation of 13β-methyl-17α-ethynyl-$\Delta^{5(10),9(11)}$-gonadiene-17β-ol-3-one, I, with R=CH₃, consists first of converting 13β-methyl-17α-ethynyl-$\Delta^{4,9}$-gonadiene-17β-ol-3-one into 3,3-dimethoxy-13β-methyl-17α-ethynyl-$\Delta^{5(10),9(11)}$-gonadiene-17β-ol by the action of methanol in a hydrochloric acid media, then of subjecting this dimethyl ketal to an acid hydrolysis. This method does not present any visible advantage in comparison with the first method referred to above.

On the other hand, in order to selectively ethynylate the ketone group in the 17 position of a 17-keto steroid, containing in its molecule other reactive ketone groups, not conjugated with a double bond, in particular a ketone group in the 3 position, it was considered that it was necessary to introduce these groups only subsequently or to protect them transitorily, particularly in the form of ketals.

An object of the present invention is the development of a simple and effective method for the production of 13β-alkyl-17α-ethynyl-$\Delta^{5(10),9(11)}$-gonadiene-17β - ol - 3-ones.

A further object of the present invention is the development of a process for the production of a 17α-ethynylated steroid of the formula

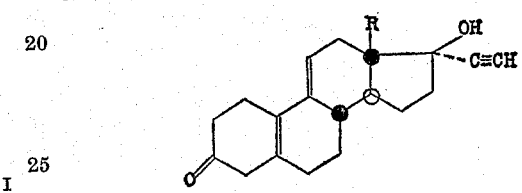

wherein R represents an alkyl having from 1 to 4 carbon atoms, which comprises the steps of ethynylating a compound of the formula

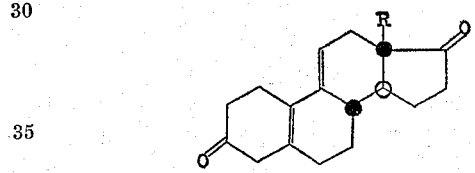

wherein R has the above-assigned value by the action of an ethynylating agent selected from the group consisting of (1) acetylene in the presence of liquid ammonia and an alkali metal and (2) acetylene in the presence of an alkali metal tertiary-lower-alkanolate, in the presence of an organic solvent and an inert atmosphere at temperatures from about −75° C. to about 50° C., and recovering said 17α-ethynylated steroid.

A further object of the present invention is the obtention of the novel intermediates and final products:

(a) 13β-ethyl-17α-ethynyl-$\Delta^{5(10),9(11)}$-gonadiene-17β - ol-3-one
(b) 13β-n-propyl-17α - ethynyl - $\Delta^{5(10),9(11)}$ - gonadiene-17β-ol-3-one
(c) β-n-propyl-$\Delta^{5(10),9(11)}$-gonadiene-3,17-dione These and other objects of the invention will become apparent as the description thereof proceeds.

It has now been discovered that it is possible to omit the protection of the ketone group in the 3 position of 13β-R-$\Delta^{5(10),9(11)}$-gonadiene-3,17-diones as described in the prior art and by selective ethynylation of the ketone function in the 17 position, to proceed directly to the desired 17α-ethynyl-13β-R-$\Delta^{5(10),9(11)}$-gonadiene-17β-ol - 3 - ones, where R stands for an alkyl having from 1 to 4 carbon atoms.

The process of the present invention shows numerous advantages compared with the previously known processes. It is distinguished by a startling simplicity of execution. In addition, it allows the utilization of starting compounds prepared by means of total synthesis. Finally, the ethynylation reaction being selective, the process permits the introduction of the ethynyl function in the 17 position at the final stage of the synthesis.

The starting products, the 13β-R-Δ$^{5(10),9(11)}$-gonadiene-3,17-diones of the formula

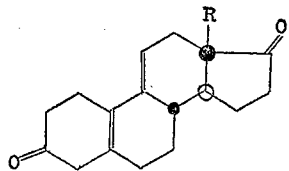

wherein R represents an alkyl having from 1 to 4 carbon atoms, may be obtained, starting from the corresponding 4,5-seco-13β-R-Δ$^9$-gonene-3,5,17-triones, according to a process analogous to that described in the French Patent No. 1,375,078 and the copending, commonly-assigned United States Patent 3,282,785, which consists in reacting pyrrolidine with a 4,5-seco-13β-R-Δ$^9$-gonene-3,5,17-trione, obtained by means of total synthesis, followed by treating the enamine thus formed with acetic acid according to the following flow diagram:

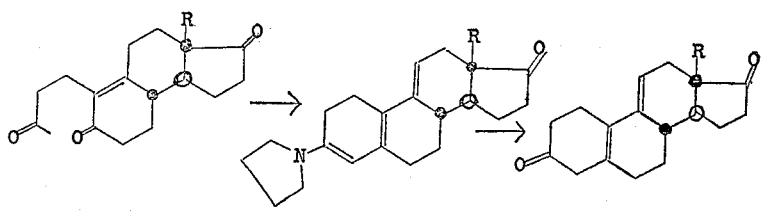

The process, object of the invention, consists in that a 13β-R-Δ$^{5(10),9(11)}$-gonadiene-3,17-dione of the Formula II

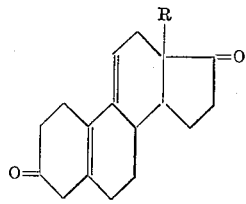

is subjected to a selective ethynylation by means of (1) acetylene and an alkali metal, such as potassium, in liquid ammonia, or (2) acetylene and an alkali metal tertiary-lower-alkanolate, such as potassium t-butylate or potassium t-amylate, and corresponding 13β-R-17α-ethynyl-Δ$^{5(10),9(11)}$-gonadiene-17β-ol-3-one of Formula I is obtained directly and selectively.

For the execution of the process of the invention, it is preferable to effect the reaction in total absence of oxygen, for example, under atmosphere of an inert gas such as nitrogen, in view of the facility of oxidation of the Δ$^{5(10),9(11)}$-gonadiene-3-ones. The reaction is carried out in the presence of an excess of the alkali metal or the alkali metal tertiary-lower-alkanolate, according to the reactant utilized, and in the presence of organic solvents such as benzene, toluene, ether, tetrahydrofuran, etc.

One method of execution, actually preferred, consists in effecting the ethynylation by means of acetylene and of an excess of potassium, while operating in liquid ammonia and ether at a low temperature between about −50° C. and about 0° C., preferentially at about −30° C., and under an atmosphere of nitrogen.

The following examples are illustrative of the invention, however, it is to be understood that they present no limiting characteristics.

EXAMPLE I

Preparation of 13β-methyl-17α-ethynyl-Δ$^{5(10),9(11)}$-gonadiene-17β-ol-3-one (I, R=—CH$_3$)

While agitating under atmosphere of nitrogen, 17 gm. of potassium were dissolved in 800 cc. of liquid ammonia and then a stream of acetylene was allowed to bubble through the solution for 15 minutes. 200 cc. of diethyl ether were added to the solution, then 40 gm. of 13β-methyl-Δ$^{5(10),9(11)}$-gonadiene-3-17-dione (II, R=CH$_3$) were introduced therein and the agitation was continued for a period of 4 hours at a temperature of about −30° C., while a small amount of acetylene was allowed to bubble through the solution.

After this period of contact, 80 gm. of ammonium chloride were introduced into the reaction medium in small fractions. The reaction mixture was agitated for 15 minutes further after the end of this addition and the stream of acetylene was halted.

The reaction mixture was then poured into 2 liters of an ice water mixture containing 40 gm. of ammonium chloride and was then agitated in total absence of light for 30 minutes under atmosphere of nitrogen. Next, the precipitate was vacuum filtered, washed several times with water and with a 10% oxalic acid solution until complete neutrality of the wash waters was attained and dried under vacuum at room temperature. 42.75 gm. of raw product were obtained.

42 gm. of this raw product obtained were dissolved in total absence of light in 420 cc. of methylene chloride. Then 126 gm. of "Florisil" were slowly added. The mixture was permitted to stand in contact for 15 minutes and then vacuum filtered. The filtrate was distilled to dryness first under ordinary pressure, then under vacuum.

The residue obtained, purified by trituration in isopropyl ether, gave 33.65 gm. of 13β-methyl-17α-ethynyl-Δ$^{5(10),9(11)}$-gonadiene-17β-ol-3-one (I, R=—CH$_3$), having a melting point of 157° C., and a specific rotation $[\alpha]_D^{20}$ = +132° (c.=0.5% in methanol).

Ultra-violet spectra (ethanol): λ max.=240 mμ

This product is insoluble in water, soluble in the cold in ether, acetone, ethyl acetate and benzene and very soluble in alcohol at room temperature.

EXAMPLE II

Preparation of 13β-ethyl-17α-ethynyl-Δ$^{5(10),9(11)}$-gonadiene-17β-ol-3-one (I, R=—C$_2$H$_5$)

1.5 gm. of potassium were added to a mixture of 15 cc. of tertiary amyl alcohol and 6 cc. of dry benzene. This mixture was heated to 60–65° C. while being agitated under atmosphere of nitrogen for 1 hour then a stream of acetylene was permitted to bubble through the mixture for 1½ hours. Next, the mixture was cooled to 25° C. and, while continuing bubbling acetylene therethrough, a solution of 280 mg. of 13β-ethyl-Δ$^{5(10),9(11)}$-gonadiene-3,17-dione (II, R=C$_2$H$_5$; ultra-violet spectra (ethanol): λ max.=240–241 mμ) in a 1 to 1 mixture of benzene/ether was added thereto. The mixture was agitated under a stream of acetylene for a further 2 hours. Then, 25 cc. of ice water containing ammonium chloride were added. The mixture was agitated in the total absence of light under atmosphere of nitrogen for 15 minutes. The mixture was then decanted and the organic phase was washed with water until neutrality, dried and distilled to dryness. The residue thus obtained was purified by two successive triturations from isopropyl ether. In this manner, 13β-ethyl-17α-ethynyl-$\Delta^{5(10),9(11)}$-gonadiene-17β-ol-3-one (I, R=$C_2H_5$) was isolated.

Ultra-violet spectra (ethanol): λ max.=241 mμ

This compound is not described in the literature.

EXAMPLE III

*Preparation of 13β-n-propyl-17α-ethynyl-$\Delta^{5(10),9(11)}$-gonadiene-17β-ol-3-one (I, R=$-CH_2-CH_2-CH_3$)*

By following the procedure of Example I, starting out with 13β-n-propyl-$\Delta^{5(10),9(11)}$-gonadiene-3,17-dione (II, R=$-CH_2-CH_2-CH_3$), and after recrystallization from hexane, 13β-n-propyl-17α-ethynyl-$\Delta^{5(10),9(11)}$-gonadiene-17β-ol-3-one (I, R=$-CH_2-CH_2-CH_3$) was obtained, having a melting point of 140° C. and a specific rotation $[\alpha]_D^{20}$=+73° (c.=0.5% in methanol).

Ultra-violet spectra (ethanol)=λ max.=241-242 mμ

This compound is not described in the literature.

13β-n-propyl-17α-ethynyl-$\Delta^{5(10),9(11)}$-gonadiene-17β-ol-3-one possesses an interesting physiological activity. In particular the compound possesses a progestative activity.

13β-n-propyl-$\Delta^{5(10),9(11)}$-gonadiene-3,17-dione utilized as a starting compound in this example may be prepared in the following manner.

0.5 gm. of 3-ethylenedioxy-13β-n-propyl-$\Delta^{5(10),9(11)}$-gonadiene-17-one (melting point=95-100° C.), prepared according to French Patent No. 1,369,955, was dissolved in 4 cc. of pure acetic acid. Next, 1 cc. of water was added thereto and the mixture was agitated for 4 hours at a temperature of 20° C. under atmosphere of nitrogen and then poured into ice water. A raw product precipitated, which product was extracted with methylene chloride. The methylene chloride extract was washed with water, then with a saturated aqueous solution of sodium bicarbonate and again with water. After drying the solution over sodium sulfate, it was vacuum filtered and subjected to chromatography through magnesium silicate. The column was eluted with methylene chloride, then with methylene chloride containing 2% of acetone. The acetonic fraction was evaporated to dryness, and 78 mg. of a residue were obtained, this residue being the amorphous 13β-n-propyl-$\Delta^{5(10),9(11)}$-gonadiene-3,17-dione (II, R=$-CH_2-CH_2-CH_3$) which was utilized as such for the preparation of 13β-n-propyl-17α-ethynyl-$\Delta^{5(10),9(11)}$-gonadiene-17β-ol-3-one.

Infra-red spectra: wide band at 1,725 cm.$^{-1}$
Ultra-violet spectra (ethanol): λ max.=241 mμ

This compound is not described in the literature.

The preceding specific embodiments are illustrative of the invention. It is to be understood however that other expedients known to those skilled in the art may be employed without departing from the spirit of the invention or the scope of the appended claims.

We claim:
1. 13β-n-propyl-$\Delta^{5(10),9(11)}$-gonadiene-3,17-dione.
2. 13β-ethyl-$\Delta^{5(10),9(11)}$-gonadiene-3,17-dione.

References Cited
UNITED STATES PATENTS

| | | | |
|---|---|---|---|
| 2,843,609 | 7/1958 | Colton | 160—397.5 |
| 2,888,471 | 5/1959 | Sondheimer et al. | 260—397.4 |
| 3,041,359 | 6/1962 | Ringold et al. | 260—397.3 |
| 3,282,785 | 11/1966 | Joly et al. | 167—65 |

LEWIS GOTTS, *Primary Examiner.*

ELBERT L. ROBERTS, *Examiner.*

H. A. FRENCH, *Assistant Examiner.*